(12) United States Patent
Maeda

(10) Patent No.: US 8,036,083 B2
(45) Date of Patent: Oct. 11, 2011

(54) OPTICAL DISK DEVICE

(75) Inventor: Tomohisa Maeda, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 596 days.

(21) Appl. No.: 12/244,353

(22) Filed: Oct. 2, 2008

(65) Prior Publication Data
US 2009/0092017 A1    Apr. 9, 2009

(30) Foreign Application Priority Data

Oct. 4, 2007  (JP) ................................. 2007-260652

(51) Int. Cl.
*G11B 27/36*    (2006.01)
(52) U.S. Cl. .................. 369/53.45; 369/44.26; 369/53.2
(58) Field of Classification Search ........................ None
See application file for complete search history.

(56) References Cited

U.S. PATENT DOCUMENTS

| | | | | |
|---|---|---|---|---|
| 2004/0246846 | A1* | 12/2004 | Takahashi et al. | 369/53.2 |
| 2005/0018583 | A1* | 1/2005 | Worthington et al. | 369/103 |
| 2006/0067193 | A1* | 3/2006 | Matsuba | 369/53.2 |
| 2006/0098549 | A1* | 5/2006 | Senoo et al. | 369/59.12 |
| 2006/0198264 | A1* | 9/2006 | Ueno et al. | 369/53.22 |
| 2006/0280053 | A1* | 12/2006 | Bang et al. | 369/30.32 |

FOREIGN PATENT DOCUMENTS

JP    2006120225    5/2006

\* cited by examiner

*Primary Examiner* — Joseph Feild
*Assistant Examiner* — Huy Nguyen
(74) *Attorney, Agent, or Firm* — Pillsbury Winthrop Shaw Pittman, LLP

(57) ABSTRACT

This optical disk device includes an examination means which examines a first physical characteristic of an optical disk, and a servo means which starts servo control based upon that first physical characteristic. This optical disk device includes a read means which incorporates the examination means, and which reads type information from the optical disk under that servo control based upon the first physical characteristic. This optical disk device includes a control means which decides whether or not a second physical characteristic of the optical disk, which is determined as a standard for the type of type information read, and the first physical characteristic, agree with one another. And, if the control means has decided that these two physical characteristics do not agree with one another, it commands the read means to read replay data from the optical disk, under that servo control based upon the first physical characteristic.

7 Claims, 4 Drawing Sheets

OPTICAL DISK DEVICE

CROSS REFERENCE

This Nonprovisional application claims priority under 35 U.S.C. §119(a) on Patent Application No. 2007-260652 filed in Japan on Oct. 4, 2007, the entire contents of which are hereby incorporated by reference.

BACKGROUND OF THE INVENTION

The present invention relates to an optical disk device which reads data recorded upon an optical disk under servo control.

In the prior art, optical disk devices are generally widespread which, under servo control, irradiate laser light upon optical disks and read and replay data from the optical disks.

When an optical disk is loaded into this optical disk device, first, the optical disk device examines a first physical characteristic of that optical disk. The physical characteristic may be, for example, the reflectivity of the data recording surface of the optical disk to laser light, the wobble frequency of its data recording surface, or the rotational speed of a spindle motor when a constant voltage is applied to the spindle motor. Next, the optical disk device executes servo control based upon this first physical characteristic, and, under this servo control, reads type information which specifies the type of the optical disk. The type of the optical disk may be, for example, DVD-ROM, DVD-R, or DVD-RW. And the optical disk device makes a decision as to whether or not the first physical characteristic agrees with a second physical characteristic of the optical disk which is determined as being the standard for that type. Moreover, the optical disk device only starts reading replay data from the optical disk, if it has been decided that the first physical characteristic and the second physical characteristic agree with one another. Due to this, replay starts, and the user is able to view video and audio recorded upon the optical disk.

It should be understood that, in Japanese Laid-Open Patent Publication 2006-120225, there is proposed an optical disk device which decides whether or not the physical format information and the logical format information of an optical disk specify the same type of optical disk.

However, sometimes the type information described above is inaccurate due to a cause such as a recording failure of the data upon the optical disk, or the like. In this case, the first physical characteristic and the second physical characteristic do not agree with one another, and an optical disk device according to the prior art described above is not able to start reading out the replay data.

Thus, with an optical disk device according to the prior art described above, if the optical disk type information is not accurate, it has not been possible to replay that optical disk. Accordingly the user has been obliged to abandon his attempt to view the video and audio recorded upon the optical disk.

The objective of the present invention is to provide an optical disk device which can start reading replay data from an optical disk, even if the type information on the optical disk is inaccurate, and which is still capable of replaying the video and audio recorded upon the optical disk.

SUMMARY OF THE INVENTION

The optical disk device according to the present invention includes an examination means which, when an optical disk is loaded, examines a first physical characteristic of that optical disk and a servo means which starts servo control based upon that first physical characteristic. With this structure, the above physical characteristic may be the rotational speed or the RPM of a spindle motor which rotates the optical disk when a constant voltage is applied to that spindle motor, the reflectivity of the data recording surface of the optical disk to laser light, and the wobble frequency of that data recording surface. And the servo control includes tracking servo control, focus servo control, and spindle motor servo control.

Moreover, this optical disk device includes a read means, incorporating the above examination means, which reads from the optical disk type information which specifies the type of the optical disk, under the above servo control based upon the first optical characteristic. The type of the optical disk may, for example, be DVD-ROM, DVD-R, DVD+R, DVD-RAM, or DVD-R.

Furthermore, this optical disk device includes a control means which decides whether or not a second physical characteristic of the optical disk, which is determined as a standard for the type of type information read by the read means, and said first physical characteristic, agree with one another. And, if it has decided that these two physical characteristics do not agree with one another, then the control means commands the read means to read replay data from the optical disk, under the above servo control based upon the first physical characteristic. Due to this, replay of the optical disk is started.

DETAILED DESCRIPTION OF THE INVENTION

Figure 1:
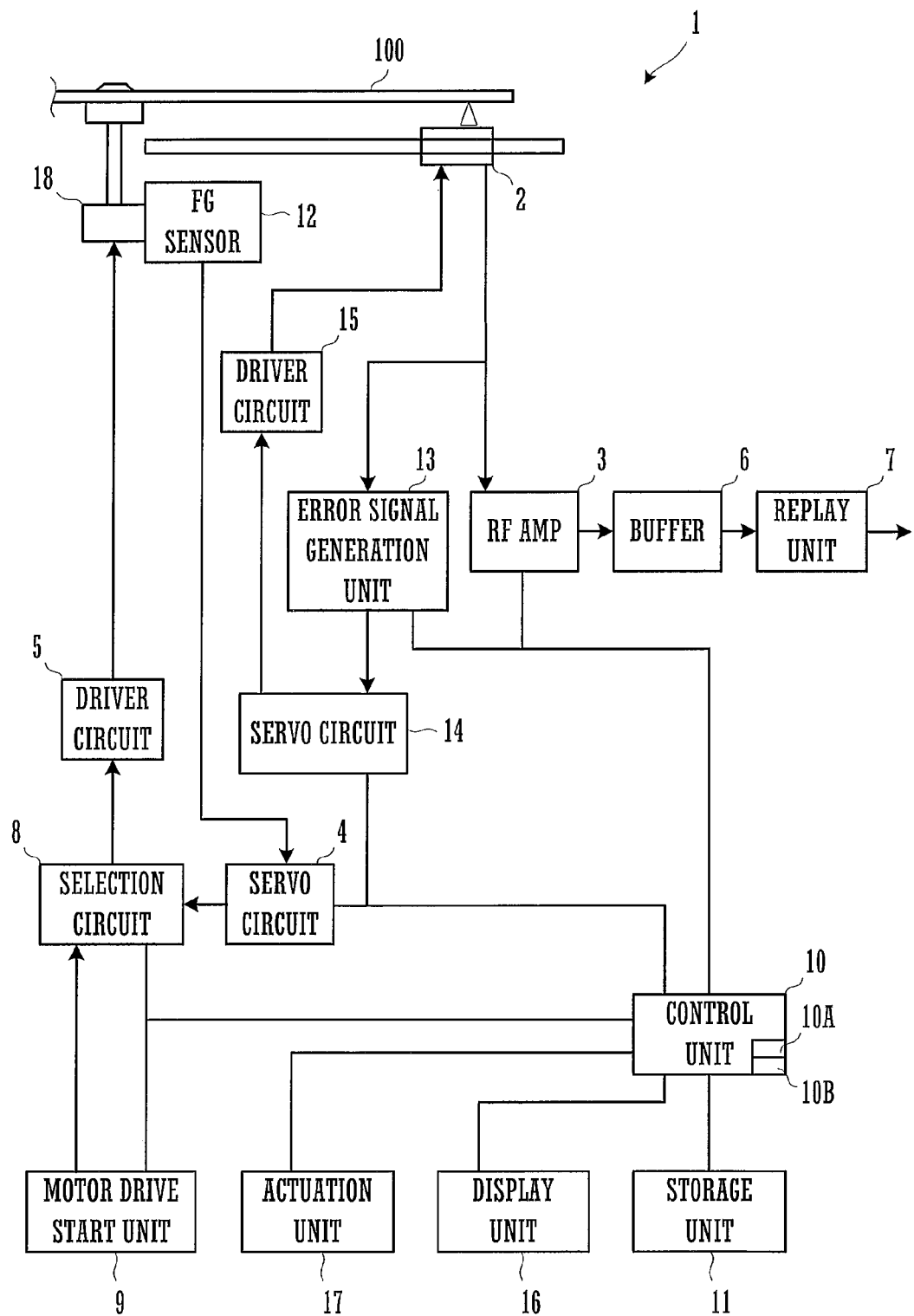
FIG. 1 is a block diagram showing the structure of the main portion of an optical disk device which is an embodiment of the present invention.

FIG. 1 is a block diagram showing the structure of the main portion of an optical disk device which is an embodiment of the present invention. This optical disk device is a so called DVD player. The optical disk device 1 comprises a spindle motor 18 which rotates a DVD 100 (Digital Versatile Disk), a FG (Frequency Generator) sensor 12 which is fitted to a spindle motor 18 and detects the rotational speed of the spindle motor 18, a servo circuit 4 which generates a spindle motor servo signal based upon the FG pulse signal inputted from the FG sensor 12 which specifies the rotational speed of the motor 18, a motor drive start unit 9 which generates a rotation starting voltage, a selection circuit 8 which changes over the input to a driver circuit 5 according to command from a control unit 10, as will be described hereinafter, and the drive circuit 5 which drives the spindle motor 18 based upon an electrical signal which is inputted. The motor drive start unit 19 acquires a supply of drive power from a power supply unit (not shown in the figures) which generates that drive power from the commercial power supply, and generates said rotation starting voltage.

Moreover, this optical disk device 1 comprises a pickup head 2 which irradiates laser light upon a DVD which is being rotated by the spindle motor 18, an error signal generation unit 13 which generates an error signal based upon the light reflected from the disk, a servo circuit 14 which generates a servo signal based upon this error signal, and the driver circuit 15 which performs servo control based upon this servo signal. In the following, the pickup head 2 is termed the "PU head".

Moreover, the optical disk device 1 comprises a control unit 10 which controls the operation of the various sections of the optical disk device 1, an RF amp 3 which generates an RF signal from the reflected light detected by the PU head 2 and thereby acquires data, a buffer RAM 6 which temporarily stores this data, and a replay unit 7 which sequentially reads out data from the buffer RAM and generates a replay signal which it outputs to the exterior of the optical disk device.

Furthermore, this optical disk device 1 comprises an actuation unit 17 which receives input actuation from the user, and a display unit 16 which displays the operational state of the optical disk device and the like.

It should be understood that, while the use of a DVD (which is one type of optical disk) is explained in this embodiment, in an actual implementation, this may be some other type of disk, such as a Blu-ray disk or the like.

Furthermore, the FG sensor 12, the servo circuit 4, the driver circuit 5, the error signal generation unit 13, the servo circuit 14, and the driver circuit 15 correspond to the "servo means" of the claims. And the PU head 2, the RF amp 3, and the replay unit 7 correspond to the "read means" of the claims.

First, the spindle servo control will be explained. Initially, due to the constant rotation starting voltage which is generated by the motor drive start unit 9, the driver circuit 5 rotates the DVD 100 at a constant rotational speed, i.e. at constant RPM. Subsequently, spindle servo control is performed. First, the control unit 10 commands the selection circuit 8 to change over the input to the driver circuit 5 to the servo circuit 4. As the DVD 100 rotates, the FG sensor 12 outputs to the servo circuit 4, as an FG pulse signal, a pulse signal of equal width for each rotation. And, based upon this FG pulse signal inputted from the FG sensor 12 which indicates the rotational speed, the servo circuit 4 generates a spindle motor servo signal for bringing the rotational speed of the spindle motor 18 to a target rotational speed or a target RPM, and outputs this to the driver circuit 5. And the driver circuit 4 drives the spindle motor 18 based upon this spindle motor servo signal which is inputted. Spindle servo control is performed by repeating this series of operations.

Next, the focus servo control and the tracking servo control will be explained.

The PU head 2 comprises a laser diode (LD), a collimator lens, a beam splitter, an objective lens, a photodetector, a thread motor, and an actuator, none of which are shown in the figures.

In a similar manner to the case with a per se known optical disk device, the PU head 2 is fitted to an axis which extends along the radial direction of the DVD 100, so as to shift freely along that axis. And the thread motor shifts the PU head 2 in the radial direction of the DVD 100.

The LD is a light source which outputs laser light. And the photodetector comprises a plurality of light reception elements, and detects the light reflected back from the DVD 100. The light reception area of this photodetector may be, for example, divided into four almost equal light reception regions.

The objective lens adjusts the position upon the DVD 100 at which the laser light is irradiated. Moreover, the actuator shifts the objective lens in the direction towards and away from the DVD 100, and in the radial direction of the DVD 100.

The error signal generation unit 13 generates a focus error signal (hereinafter termed the "FE signal") based upon the reflected light from the DVD 100 which has been detected by the plurality of light reception elements which make up the photodetector of the PU head 2, and outputs this FE signal to the servo circuit 14. Furthermore, the error signal generation unit 13 generates a tracking error signal (hereinafter termed the "TE signal") based upon the reflected light from the DVD 100 which has been detected by the plurality of light reception elements which make up the photodetector of the PU head 2, and outputs this TE signal to the servo circuit 14.

Based upon the FE signal which is outputted by the error signal generation unit 13, the servo circuit 14 generates a focusing servo signal for bringing the value of the FE signal to zero (its reference level), and outputs this focusing servo signal to the driver circuit 15. In a similar manner, based upon the TE signal which is outputted by the error signal generation unit 13, the servo circuit 14 generates a tracking servo signal for bringing the value of the TE signal to zero (its reference level), and outputs this tracking servo signal to the driver circuit 15.

The driver circuit 15 supplies the focusing servo signal to the actuator and shifts the objective lens of the pickup head 2 along the direction of the optical axis with respect to the DVD 100, and thereby performs focus servo control to focus the laser light upon the recording surface of the DVD 100. Moreover, the driver circuit 15 supplies the tracking servo signal to the actuator and shifts the objective lens of the pickup head 2 along the radial direction of the DVD 100, and thereby performs tracking servo control to irradiate the laser light along the center of the track of the DVD 100.

By performing this focus servo control and tracking servo control, along with keeping the laser light following along the desired track, it is also possible to keep the laser light focused upon that track.

Finally, the operation during replay will be explained. The PU head 2 irradiates laser light of read power upon the DVD 100, and detects the light reflected from the DVD 100 with the photodetector. By doing this, the optical disk device 1 reads out the data recorded upon the DVD 100 optically.

The RF amp 3 generates an RF signal based upon the reflected light from the DVD 100, which has been detected by the plurality of light reception elements included in the photodetector provided to the PU head 2. This RF signal is a read signal for the data which is recorded upon the DVD 100. And the RF amp 3 amplifies this RF signal, processes it, and extracts video and audio data therefrom. The data which is extracted here may be, for example, encoded according to MPEG. Finally, the RF amp 3 sequentially stores the video and audio data which has been extracted in the buffer RAM 6.

The replay unit 7 internally houses a decoder (not shown in the figures) which sequentially reads out and decodes the data which is stored in the buffer RAM 6. This replay unit 7 generates a replay signal from the data which has been decoded by the decoder, and outputs this replay signal to the exterior of the optical disk device 1. A liquid crystal monitor and a speaker may, for example be connected to the optical disk device 1. Due to this, the user is able to view the contents stored upon the DVD 100 via the liquid crystal monitor and the speaker or the like.

The storage unit 11 may, for example, consist of an EEPROM. A control program is stored in the storage unit 11, in which a control method for controlling the operation of the various sections of this optical disk device 1 is described.

The control unit 10 may, for example, consist of a microcomputer. This control unit 10 internally includes a RAM 10A which serves as a working space for keeping data which is being processed by the control program described above, and a counter 10B which counts the number of times that a decision is performed. The details of this counter 10B will be described hereinafter.

A plurality of keys which receive input actuation from the user are provided to the actuation unit 17. And the actuation unit 17 transmits signals (commands) to the control unit 10, according to actuation of these keys.

The display unit 16 is, for example, constituted by a LCD (Liquid Crystal Display). This display unit 16 displays the time, information which specifies the operational state of the optical disk device 1, information related to the data which is being replayed, messages to the user, and the like.

Figure 2:
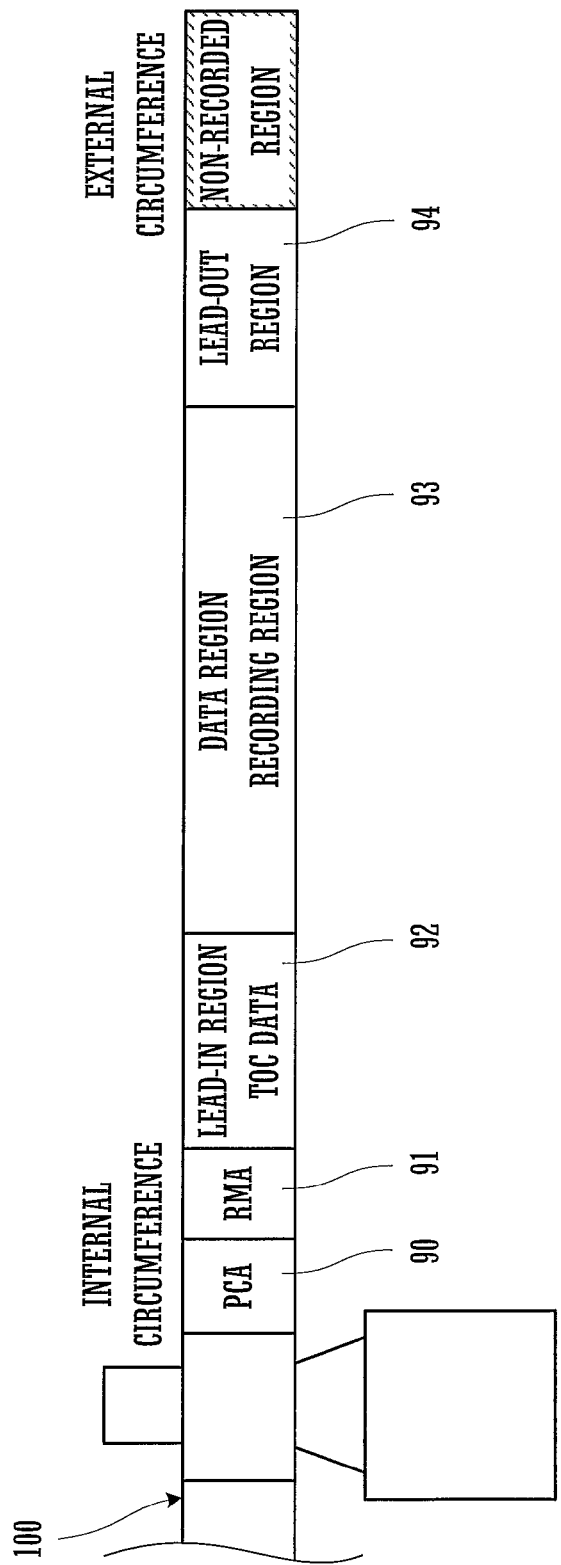
FIG. 2 is a figure showing the recording region of a DVD 100.

FIG. 2 is a figure showing the recording region of a DVD 100. This recording region of the DVD 100 is divided, from its internal periphery to its internal periphery, into a PCA 90, a RMA 91, a lead-in region 92, a data region 93, and a lead-out region 94.

The PCA 90 is a region in which proofing (calibration) of the laser power is performed. Due to this, the optical disk device 1 may acquire the number of times that proofing (calibration) of the laser power has been performed by examining the PCA 90.

The RMA 91 is a region in which recording management information is recorded which the optical disk device 1 needs. This recording management information is information which specifies the data recording range upon the DVD 100.

The lead-in region 92 is a region in which physical format information for the DVD 100 is recorded. This physical format information is information which includes type information which specifies the optical disk type of the DVD 100. This optical disk type may be, for example, DVD-ROM, DVD-R, DVD+R, DVD-RAM, DVD-RW, or DVD+RW.

The data region 93 is a region in which data which has been stored is recorded. And the lead-out region 94 is a region which is created when data which has been stored is finalized.

Figure 3:
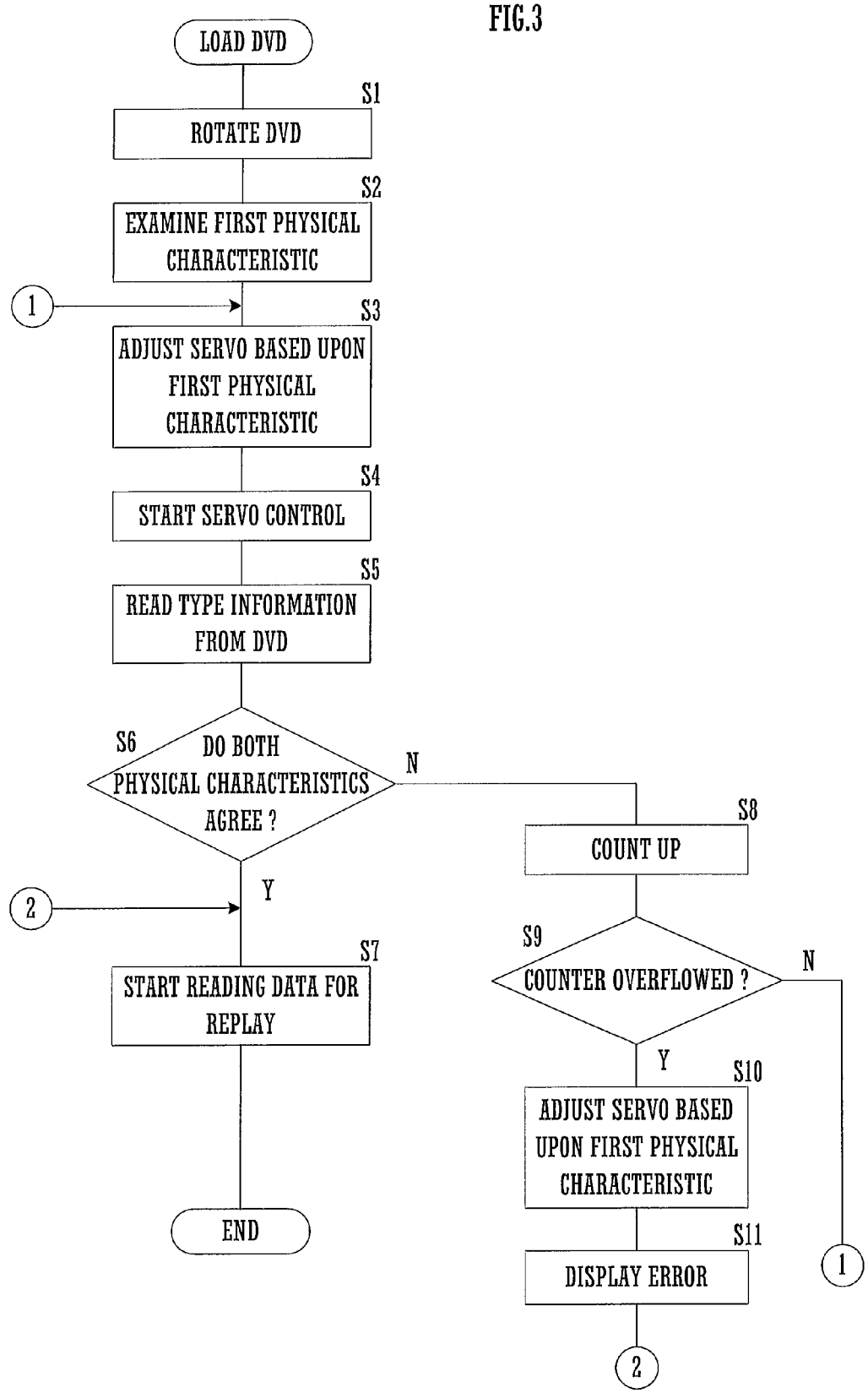
FIG. 3 is a flow chart showing the operation performed by a control unit of this optical disk device according to an embodiment of the present invention.

FIG. 3 is a flow chart showing the operation performed by a control unit of this optical disk device according to an embodiment of the present invention. This is the operation which is performed when the user has loaded the DVD 100 into the optical disk device 1.

When the DVD 100 is loaded into the optical disk device 1, the control unit 10 generates a rotation starting voltage, which is a constant voltage, and supplies it to the motor drive start unit 9, thus causing the DVD 100 to be rotated (a step S1).

Next, the control unit 10 examines a physical characteristic of the DVD 100 (a step S2). This physical characteristic may be, for example, the reflectivity of laser light from the data recording surface of the DVD 100, the wobble frequency of the data recording surface, or the rotational speed of the spindle motor 18 when a constant voltage is applied to the spindle motor 18. The control unit 10 irradiates laser light from the PU head 2 upon the DVD 100, and, by examining this laser light, acquires the reflectivity and the wobble frequency of the laser light. Furthermore, the control unit 10 acquires the rotational speed of the spindle motor 18 by examining the FG pulse signal which is outputted from the FG sensor 12. Here, the rotational speed which is acquired when a constant voltage is applied is stored in advance in the control program in correspondence with the disk size. Due to this, the control unit is able to calculate the disk size from the rotational speed of the spindle motor 18.

Based upon the first physical characteristic in the step S2, the control unit 10 performs servo adjustment (a step S3). This servo adjustment may be, for example, gain adjustment of the error signal generation unit 13 and/or gain adjustment of the servo circuit 4.

And, based upon the first physical characteristic in the step S2, the control unit 10 starts spindle servo control, focus servo control, and tracking servo control (a step S4).

Then, under this servo control based upon the first physical characteristic of the step S2, the control unit 10 reads (a step S5) the physical format information from the DVD 100 with the PU head 2. This physical format information which has been read in is inputted to the control unit 10 via the RF amp 3. And the control unit 10 analyzes the type information which is included in the physical format information, and thereby distinguishes the type of the DVD 100. By doing this, the control unit 10 is able to identify which type of optical disk this DVD 100 is, among the types DVD-ROM, DVD-R, DVD+R, DVD-RAM, DVD-RW, or DVD+RW. Now, the physical characteristics which are determined as standard of these various optical disks are different between the different types. For example, in the case of a DVD-ROM, the disk size is 120 mm, the reflectivity is from 45% to 85%, and there is no wobble frequency. And, in the case of a DVD-R, the disk size is 120 mm, the reflectivity is from 45% to 85%, and the wobble frequency is 140 kHz. Moreover, in the case of a DVD+R, the disk size is 120 mm, the reflectivity is from 45% to 85%, and the wobble frequency is 817 kHz. These physical characteristics of optical disks are described in advance in the control program, in correspondence to the types of disk.

And the control unit 10 decides whether or not the first physical characteristic agrees with the second physical characteristic of the DVD 100 which is determined as standard for its type (a step S6). For example, if the first physical characteristic is "disk size 120 mm, reflectivity 65%, and wobble frequency 140 kHz", and if the type of the DVD 100 is DVD-R, then the result of the decision is affirmative. Conversely, if the first physical characteristic is "disk size 120 mm, reflectivity 55%, and wobble frequency 140 kHz", and if the type of the DVD 100 is DVD+R, then the result of the decision is negative. Here, if the result of the decision is negative, then a scenario is assumed in which the type information which specifies the type of the DVD 100 is inaccurate due to a failure in recording data upon the DVD 100 or the like.

If it has been decided in the step S6 that the first physical characteristic agrees with the second physical characteristic, then the control unit 10 starts the reading of the replay data with the PU head 2 (a step S7), and then this processing terminates. Due to this, replay starts, and the user is able to view the video and the audio which are recorded upon the DVD 100.

On the other hand, if it has been decided in the step S6 that the first physical characteristic does not agree with the second physical characteristic, then the control unit 10 causes the PU head 2 to read in the type information again, and repeats re-decision processing in which the decision is performed again, thus repeatedly performing the decision control (of the steps S8, S9, and S3 through S6) until the first physical characteristic agrees with the second physical characteristic. This decision control will now be described in detail below.

First, if it has been decided that the first physical characteristic does not agree with the second physical characteristic, then the control unit 10 increments the count value of the counter 10B (i.e. adds 1 to it). Now, when the count value of the counter 10B reaches a fixed number of counts, it overflows. This fixed number of counts is a value which is set in advance. It is desirable for the number of times to be from one time to three times, since, if the fixed number of counts is set to a rather large count value, the re-decision processing is repeated that number of times, so that the user is obliged to wait. In this embodiment, the fixed number of counts is set to 1.

The control unit 10 continues to return to the step S3 and repeat the above processing, until the count value of the counter 10B reaches the fixed number of counts (a step S9).

And, when the count value of the counter 10b reaches the fixed number of counts (the step S9), the control unit 10 stops this decision control, and performs servo adjustment (a step S10) based upon the first physical characteristic of the step S2. For example if, while the first physical characteristic is "disk size 120 mm, reflectivity 55%, and wobble frequency 140 kHz", the type of the DVD 100 is DVD+R, then the control unit 10 performs the servo adjustment based upon a disk size of 120 mm, a reflectivity of 55%, and a wobble frequency of 140 kHz.

And, under this servo control based upon the first physical characteristic, the control unit 10 starts the reading of the data from the DVD 100 by the PU head 2 (a step S7), and then this processing terminates. Due to this, replay is started, and the user is able to view the video and the audio which are recorded upon the DVD 100.

Accordingly, with this optical disk device 1, even in the case of a DVD 100 whose type information is inaccurate, it is possible to replay the video and the audio which are recorded upon the DVD 100.

It should be understood that sometimes an anomaly occurs during replay of the DVD 100, since the DVD 100 is replayed irrespective of whether or not the type information is inaccurate. Due to this, there is a fear that the user may possibly misunderstand and think that there may be a fault with the optical disk device 1 itself. Thus, after the step S10, the control unit 10 displays (a step S11) an error message upon the display unit 16, saying that the type information is inaccurate. This error message may read, for example, "The information specifying the type of the DVD 100 is damaged, and the type of the DVD 100 cannot be read. For this reason, this DVD 100 may not be replayed normally.". Due to this error message, the user is able to understand the cause of the anomaly. By doing this, it is possible to prevent the user from mistakenly thinking that a fault has occurred with the optical disk device 1.

Furthermore, as an embodiment of the present invention, the following variant embodiment may also be employed.

Figure 4:
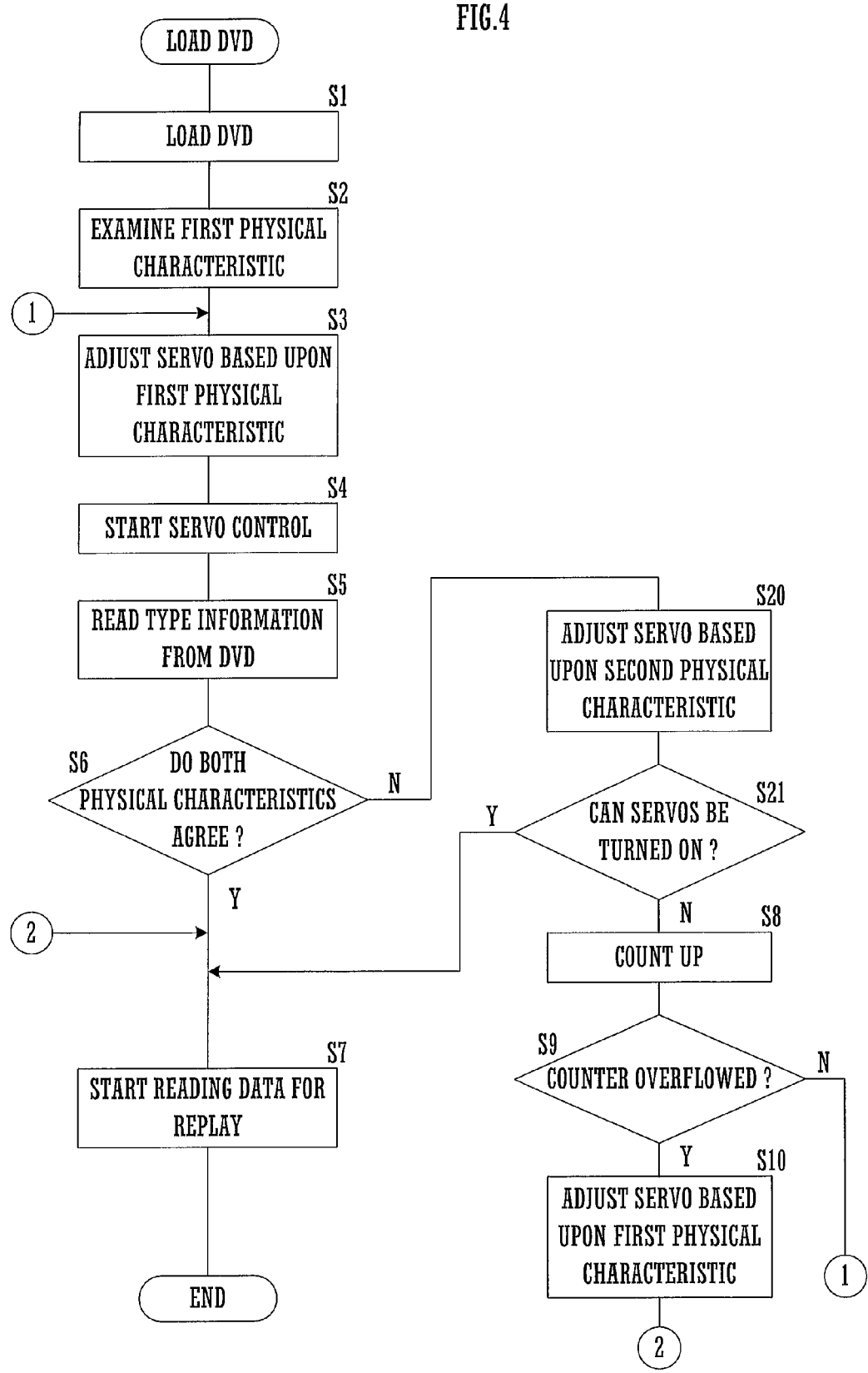
FIG. 4 is a flow chart showing the operation performed by a control unit of an optical disk device which is a variant embodiment of the present invention.

FIG. 4 is a flow chart showing the operation performed by a control unit of an optical disk device which is a variant embodiment of the present invention. In this operation, the processing of steps S20 and S21 is added between the steps S6 and S8 of FIG. 3, while the other processing steps (S1 through S8) are the same.

When, in the step S6, it has been decided that the first physical characteristic does not agree with the second physical characteristic, then the control unit 10 performs adjustment of the servo based upon the second physical characteristic of the DVD 100 which is determined by the standard (the step S20). For example if, while the first physical characteristic is "disk size 120 mm, reflectivity 55%, and wobble frequency 140 kHz", the type of the DVD 100 is DVD+R, then the control unit 10 performs the servo adjustment based upon a disk size of 120 mm, a reflectivity of from 45% to 85%, and a wobble frequency of 817 kHz.

And the control unit 10 makes a decision whether or not it is possible to start the spindle servo control, the focus servo control, and the tracking servo control based upon this second physical characteristic (the step S21). If the servo control based upon this second physical characteristic fails, then the control unit 10 proceeds to the step S8 and continues processing from that point.

On the other hand, if the servo control based upon this second physical characteristic is successful, then the control unit 10 starts the reading of the data from the DVD 100 by the PU head 2 (the step S7) under this servo control, and then this processing terminates.

Due to this, even if a failure has occurred in the examination of the physical characteristics in the step S2, re-decision processing is not repeated, and still it is possible to replay the video and the audio which are recorded upon the DVD 100. Because of this, it is possible to avoid making the user wait for the amount of time that the repetition of such re-decision processing would occupy. Accordingly, it is possible to shorten the time period from when the DVD 100 is loaded until the replay is started.

What is claimed is:

1. An optical disk device, comprising:
   an examination means which, when an optical disk is loaded into the optical disk device, rotates said optical disk, irradiates laser light from a pickup head upon said optical disk, and examines a first physical characteristic of said optical disk;
   a servo means which starts, based upon said first physical characteristic, servo control for keeping said optical disk at a target rotational speed or a target RPM, and for tracking the irradiation position and the focused position of said laser light along a track upon which data is recorded;
   a read means, incorporating said examination means, which, under said servo control based upon said first physical characteristic, reads from said optical disk type information which specifies the type of said optical disk; and
   a control means which decides whether or not a second physical characteristic of said optical disk, which is determined as a standard for the type of said type information read by said read means, and said first physical characteristic, agree with one another;
   and wherein said control means:
   if it has been decided that said first physical characteristic and said second physical characteristic agree with one another, commands said read means to read replay data from said optical disk; and
   if it has been decided that said first physical characteristic and said second physical characteristic do not agree with one another, commands said read means to read replay data from said optical disk, under said servo control based upon said first physical characteristic.

2. An optical disk device according to claim 1, wherein said physical characteristic is rotational speed or RPM of a spindle motor which rotates said optical disk when a constant voltage is applied to said spindle motor, the reflectivity of the data recording surface of said optical disk to laser light, and the wobble frequency of said data recording surface.

3. An optical disk device according to claim 1, wherein:
   said control means comprises:
      a decision means which repeatedly performs decision control of re-decision processing in which said read means is caused to perform said reading and said decision is performed, until said first physical characteristic and said second physical characteristic agree with one another; and
      a count means which counts the number of times that the above decision is performed; and when the count value of said count means reaches a fixed number of counts, said decision means stops said decision control, and said control means commands said read means to read replay data from said optical disk under said servo control based upon said first physical characteristic.

4. An optical disk device according to claim 3, further comprising a display means which, if the count value of said count means exceeds said fixed number of counts, displays an error message indicating that said type information is not accurate.

5. An optical disk device according to claim 4, wherein said fixed number of counts is from one time to three times.

6. An optical disk device according to claim 3, wherein said control means:

when it has been decided that said first physical characteristic and said second physical characteristic do not agree with one another, causes said servo means to execute said servo control based upon said second physical characteristic, before performing said re-decision processing; and if said servo control based upon said second physical characteristic succeeds, commands said read means to read replay data from said optical disk under this servo control.

7. An optical disk device according to claim 1, wherein said optical disk is a Blu-ray disk or a DVD.

* * * * *